United States Patent
Kang et al.

(10) Patent No.: US 8,065,446 B2
(45) Date of Patent: Nov. 22, 2011

(54) APPARATUS AND METHOD FOR DISCERNING A HOST INTERFACE

(75) Inventors: Sang-Wook Kang, Seoul (KR);
Seong-Hyun Kim, Yongin-si (KR);
Sang-Bum Kim, Suwon-si (KR);
Joong-Chul Yoon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 220 days.

(21) Appl. No.: 11/608,014

(22) Filed: Dec. 7, 2006

(65) Prior Publication Data

US 2008/0010406 A1    Jan. 10, 2008

Related U.S. Application Data

(63) Continuation-in-part of application No. 10/884,145, filed on Jul. 2, 2004, now Pat. No. 7,376,773.

(30) Foreign Application Priority Data

Jun. 2, 2006   (KR) .................. 10-2006-0049966

(51) Int. Cl.
*G06F 3/00* (2006.01)
(52) U.S. Cl. ........................... 710/16; 710/15
(58) Field of Classification Search .............. 710/16
See application file for complete search history.

(56) References Cited

U.S. PATENT DOCUMENTS

| 6,886,052 | B2 | 4/2005 | Chiu et al. | |
|---|---|---|---|---|
| 2002/0190706 | A1* | 12/2002 | Ebiya | 324/158.1 |
| 2005/0005045 | A1* | 1/2005 | Kim et al. | 710/74 |
| 2006/0000917 | A1* | 1/2006 | Kim et al. | 235/492 |

FOREIGN PATENT DOCUMENTS

| JP | 2002353994 A | 12/2002 |
|---|---|---|
| KR | 100261153 | 4/2000 |
| KR | 1020050003960 | 1/2005 |
| KR | 1020060003260 | 1/2006 |

OTHER PUBLICATIONS

English Abstract for Publication No. 2002-353994, (Japanese Patent Application listed above, published Dec. 12, 2006).
English Abstract for Publication No. 1020050003960 A, (Korean Patent Application listed above, published Jan. 12, 2005).

* cited by examiner

*Primary Examiner* — Henry Tsai
*Assistant Examiner* — John Roche
(74) *Attorney, Agent, or Firm* — F. Chau & Associates, LLC

(57) ABSTRACT

A system, apparatus and method are provided for discerning a host interface, the method including connecting a pull resistor to the interface, sequentially applying a pull voltage to the pull resistor, measuring a loaded electrical characteristic of the interface while the sequentially applied pull voltage is applied to the pull resistor, comparing the loaded electrical characteristic with a predetermined value, and identifying a specification of the interface in accordance with the comparison.

19 Claims, 6 Drawing Sheets

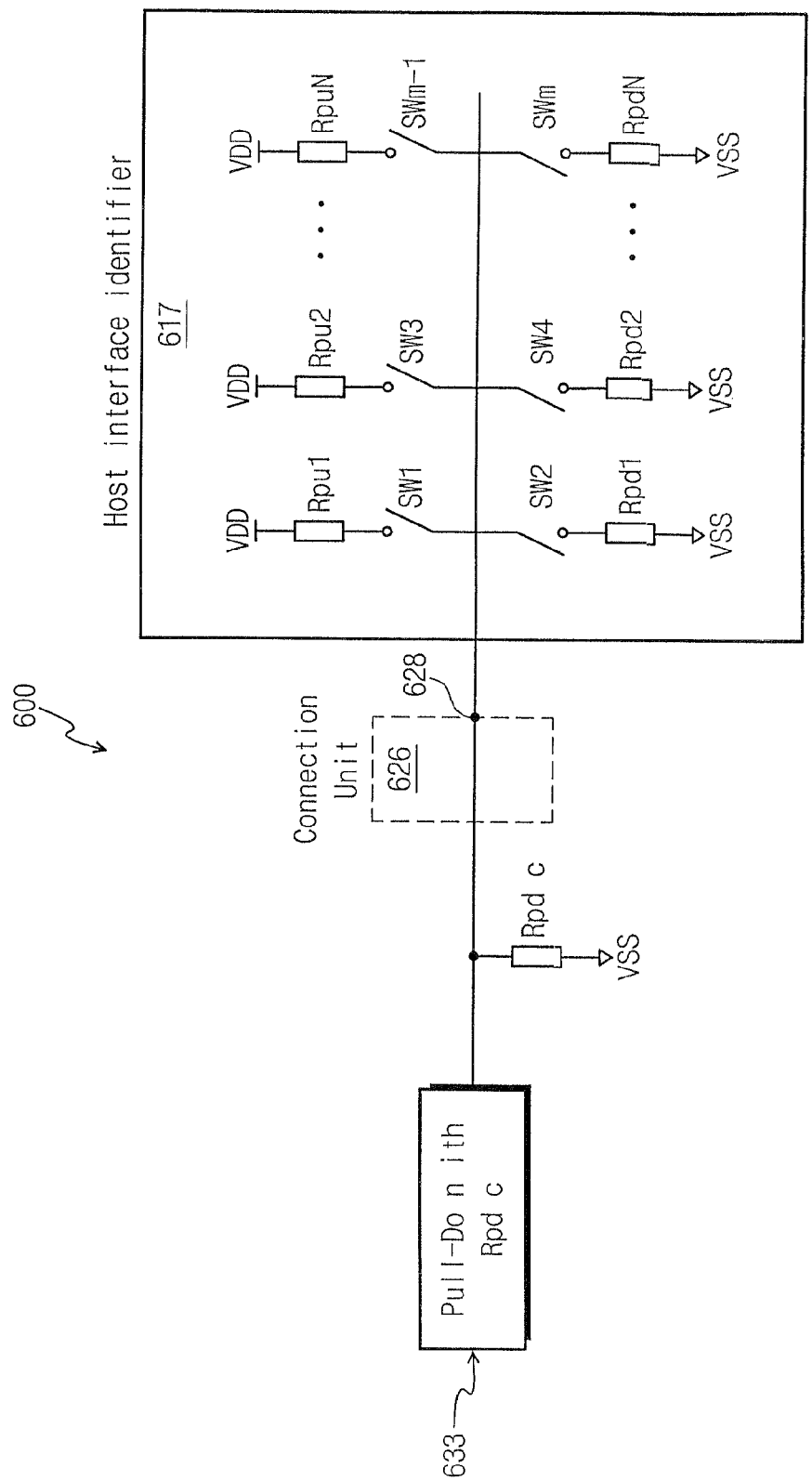

APPARATUS AND METHOD FOR DISCERNING A HOST INTERFACE

CROSS-REFERENCE TO RELATED APPLICATIONS

The present application is a continuation-in-part of U.S. application Ser. No. 10/884,145, filed on Jul. 2, 2004 and entitled "Multi-Standard Protocol Storage Devices And Methods Of Operating The Same", now issued as U.S. Pat. No. 7,376,773 on May 20, 2008, the disclosure of which is incorporated by reference herein in its entirety, and which, in turn, claims foreign priority under 35 U.S.C. §119 to Korean Patent Application Nos. 2003-76729 filed on Oct. 31, 2003, and 2003-45412 filed on Jul. 4, 2003, in the Korean Intellectual Property Office (KIPO), which are hereby incorporated by reference herein in their entireties. The present application claims foreign priority under 35 U.S.C. §119 to Korean Patent Application No. 2006-49966 filed on Jun. 2, 2006, in the Korean Intellectual Property Office (KIPO), which is hereby incorporated by reference herein in its entirety.

BACKGROUND OF THE INVENTION

The present disclosure relates to device to host interfaces, and more particularly relates to device interfaces with host-type recognition. Devices such as smart cards, Subscriber Identification Module (SIM) cards, and flash cards first connect to a host and then operate in accordance with an application. The types of hosts to which the devices can be connected continue to increase. For example, a card device may be alternately connected to a mobile phone an MP3 player, a Portable Media Player (PMP), and the like.

As shown in FIG. 1 a conventional interface system 10 includes a host 12 and a device 16. The host 12 includes a host interface 14. The device 16 includes a fixed device interface 18, and a controller 20 connected to the device interface. In operation the device 16 is connected to the host 12. The host 12 and the device 16 communicate with each other via the host interface 14 and the fixed device interface 18. The host interface 14 and the fixed device interface 18 have to have the same interface specification.

It is desirable to connect the device to an increasing variety of types of hosts and still enable to device to operate in accordance with an application. Unfortunately, since the typical host does not support all types of interfaces, the host can only communicate with the specific devices that use the same type of interface as the host. Devices such as smart cards, SIM cards and flash cards can be designed to support a plurality of interfaces. However, if the device cannot match its interface to the host interface, the device cannot communicate with a host having a fixed interface of a different type. The present disclosure addresses these and other issues.

SUMMARY OF THE INVENTION

These and other drawbacks and disadvantages of the prior art are addressed by an apparatus and method for discerning a host interface.

An exemplary system for discerning a host interface includes a host having at least one interface, a device in signal communication with the at least one interface, an interface identifier for identifying a specification of the at least one interface, the interface identifier having at least one electrical characteristic sensor in signal communication with the at least one interface, at least two switches coupled to the at least one interface, each switch in signal communication with a corresponding pull resistor coupled to a pull voltage, and a selectable device interface in signal communication with the host for communicating with the host in response to the electrical characteristic sensor.

An exemplary apparatus for discerning a host interface includes an interface identifier having at least two switches coupled to an interface, each switch in signal communication with a corresponding pull resistor coupled to a pull voltage.

An exemplary method for discerning a host interface includes connecting at least one pull resistor to the interface, sequentially applying at least one pull voltage to the at least one pull resistor measuring at least one loaded electrical characteristic of the interface while the sequentially applied at least one pull voltage is applied to the at least one pull resistor, comparing the at least one loaded electrical characteristic with at least one predetermined value, and identifying a specification of the interface in accordance with the comparison.

The present disclosure will be understood from the following description of exemplary embodiments, which is to be read in connection with the accompanying drawings.

BRIEF DESCRIPTION OF THE DRAWINGS

The present disclosure presents an apparatus and method for discerning a host interface in accordance with the following exemplary figures, wherein like elements may be indicated by like reference characters, and in which:

FIG. 6 shows a partial schematic circuit diagram of a host to device interface system for pull-down host interfaces in accordance with an exemplary embodiment of the present disclosure.

DETAILED DESCRIPTION OF PREFERRED EMBODIMENTS

The present disclosure presents an apparatus and method for host interface identification. Exemplary embodiments may discern the type of a host interface based on whether the host interface has a pull-up resistor, a pull-down resistor, a DC voltage, a ground voltage or a floating status.

Figure 1:
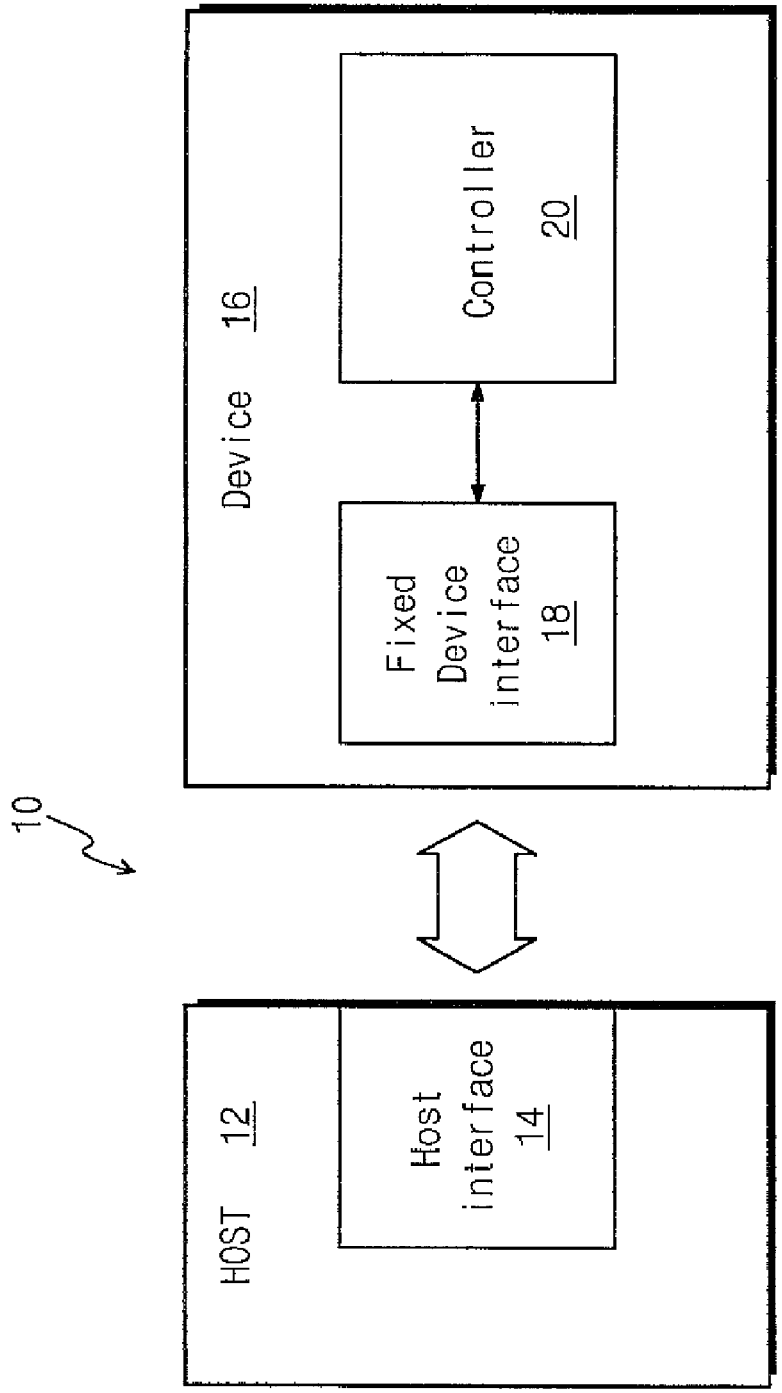
FIG. 1 shows a schematic block diagram for a conventional host to device interface system.
Figure 2:
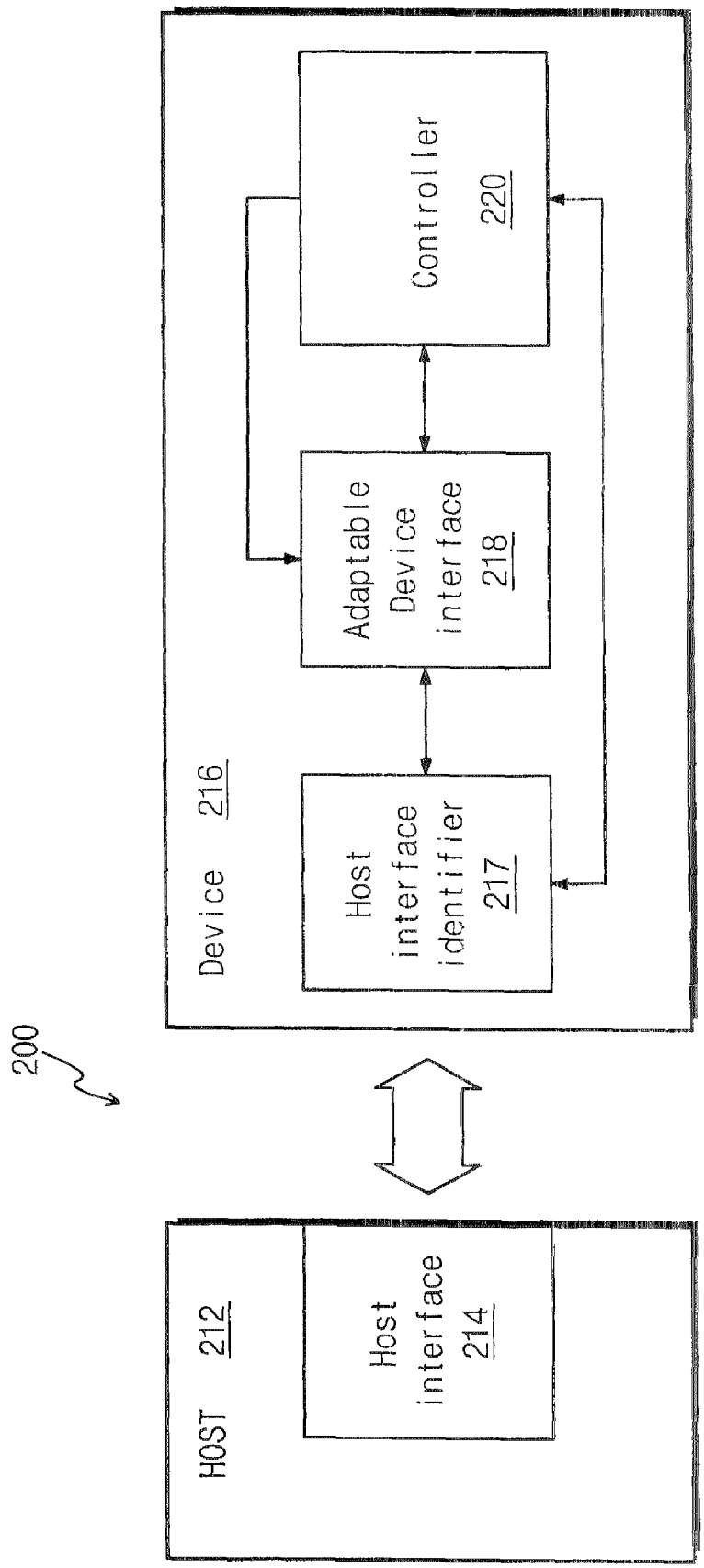
FIG. 2 shows a schematic block diagram for a host to device interface system in accordance with an exemplary embodiment of the present disclosure.

Turning to FIG. 2, an interface system in accordance with an exemplary embodiment of the present disclosure is indicated generally by the reference numeral 200. The system 200 includes a host 212 and a device 216. The host 212 includes a host interface 214. The device 216 includes a host interface identifier 217, an adaptable device interface 218 in signal communication with the host interface identifier, and a controller 220 in signal communication with the host interface identifier 217 and the adaptable device interface 218.

In operation, the device 216 is connected to the host 212. The adaptable device interface 218 is adapted or reconfigured in accordance with the host interface identifier 217 to match the type of the host interface 214. The host 212 and the device 216 communicate with each other via the host interface 214 and the adaptable device interface 218. The host interface identifier 217 of the device 216 identifies the host interface 214 and outputs the identified result to the controller 220. The controller 220 configures the corresponding adaptable device interface 218 based on the identified result. The host 212 and the device 216 communicate with each other via the host interface 214 and the adapted or configured device interface 218. For example, a given host interface 214 might support only a Multi-Media Card (MMC), a Universal Serial Bus (USB), an ISO 7816 interface, or the like.

Figure 3:
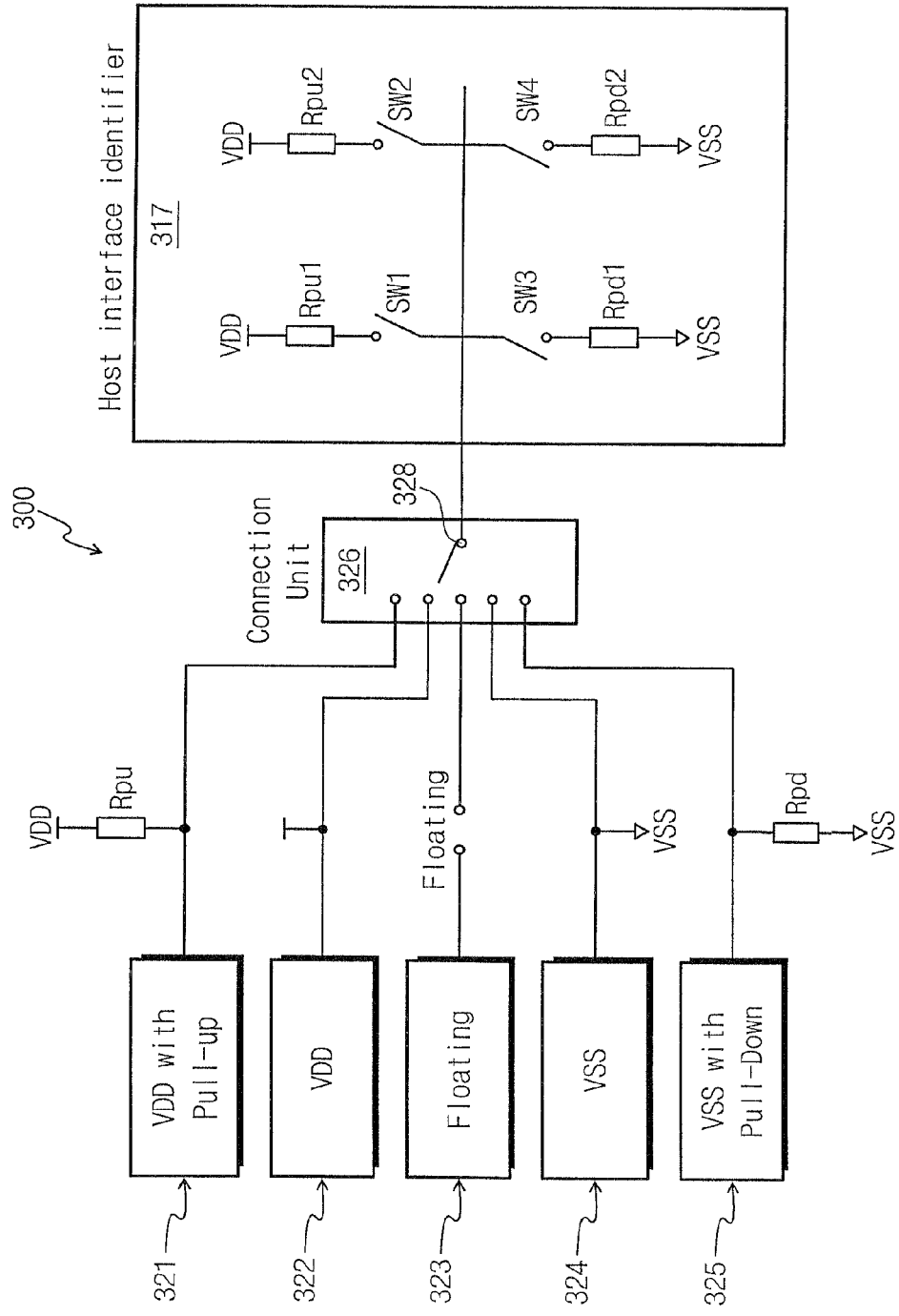
FIG. 3 shows a partial schematic circuit diagram of a host to device interface system for MMC, ISO or USB host interfaces in accordance with an exemplary embodiment of the present disclosure.

Turning now to FIG. 3, an interface system in accordance with an exemplary embodiment of the present disclosure is indicated generally by the reference numeral 300. The system 300 includes a host interface identifier 317 in signal communication with a connection unit 326. The connection unit 326 is in switchable signal communication with one type of host at a time, including a first type 321 having a high voltage potential VDD connected to an Rpu pull-up resistor, a second type 322 having a high voltage potential VDD, a third type 323 having an open or floating voltage potential, a fourth type 324 having a low voltage potential VSS, and a fifth type 325 having a low voltage potential VSS connected to an Rpd pull-down resistor.

The host interface identifier 317 includes an output terminal 328 in signal communication with a first switch SW1. The host interface identifier 317 may also have a voltage detector, such as a single transistor, in signal communication with the terminal 328. The switch SW1 is in signal communication with a first pull-up resistor Rpu1, which, in turn, is in signal communication with the high voltage potential VDD. The host interface identifier 317 further includes a second switch SW2 in signal communication with the output terminal 328. The switch SW2 is in signal communication with a second pull-up resistor Rpu2, which, in turn, is in signal communication with the high voltage potential VDD. The host interface identifier 317 further includes a third switch SW3 in signal communication with the output terminal 328. The switch SW3 is in signal communication with a first pull-down resistor Rpd1, which, in turn, is in signal communication with the low voltage potential VSS. In addition the host interface identifier 317 includes a fourth switch SW4 in signal communication with the output terminal 328. The switch SW4 is in signal communication with a second pull-down resistor Rpd2, which, in turn, is in signal communication with the low voltage potential VSS.

Thus, the host interface types 321 through 325 represent the characteristics of five different interface specifications. For example, the type 321 having VDD with pull-up represents the characteristics of an MMC interface, while the type 325 having VSS with pull-down represents that of a USB interface. The type 322 having VDD, the type 323 having floating voltage potential, and the type 324 having VSS represent those of ISO 7816 interfaces.

In operation, the host interface identifier 317 measures voltages on the connection unit 326 when the host interface identifier 317 sequentially connects each of SW1 through SW4, and then outputs the measured voltages to the controller 220 of FIG. 2. Reference is made to Table 1, which follows.

TABLE 1

|  | MMC | USB | ISO 7816 | | |
|---|---|---|---|---|---|
|  | Pull-Up (50–100K) | Pull-Down (15K) | High-Z (∞) | VDD (0) | VSS (0) |
| Pull-Up(Rpu1) (150K) | High (1) | Low (0) | High (1) | High (1) | Low (0) |
| Pull-Up(Rpu2) (1.5K) | High (1) | High (1) | High (1) | High (1) | Low (0) |
| Pull-Down(Rpd1) (1M) | High (1) | Low (0) | Low (0) | High (1) | Low (0) |
| Pull-Down(Rpd2) (5K) | Low (0) | Low (0) | Low (0) | High (1) | Low (0) |

Thus, referring back to FIG. 2 with reference to Table 1, the controller 220 compares the measured voltages with the predetermined voltage and determines the logic "High" or "Low". For example, the predetermined voltage or cut-off between a "High" and a "Low" voltage potential may be defined as (VOD-VSS)/2+VSS. The controller 220 determines the host interface 212 based on the logic values from Table 1, and sets the corresponding device interface among a plurality of interfaces within the adaptable device interface 218.

For example, an MMC host interface uses a pull-up resistor Rpu between about 50K and about 100K ohms. A USB host interface uses a pull-down resistor Rpd of about 15K ohms. Thus, a preferred embodiment has Rpu1=150K ohms: Rpu2=5K ohms, Rpd1=1000K ohms, and Rpd2=5K ohms.

Figure 4:
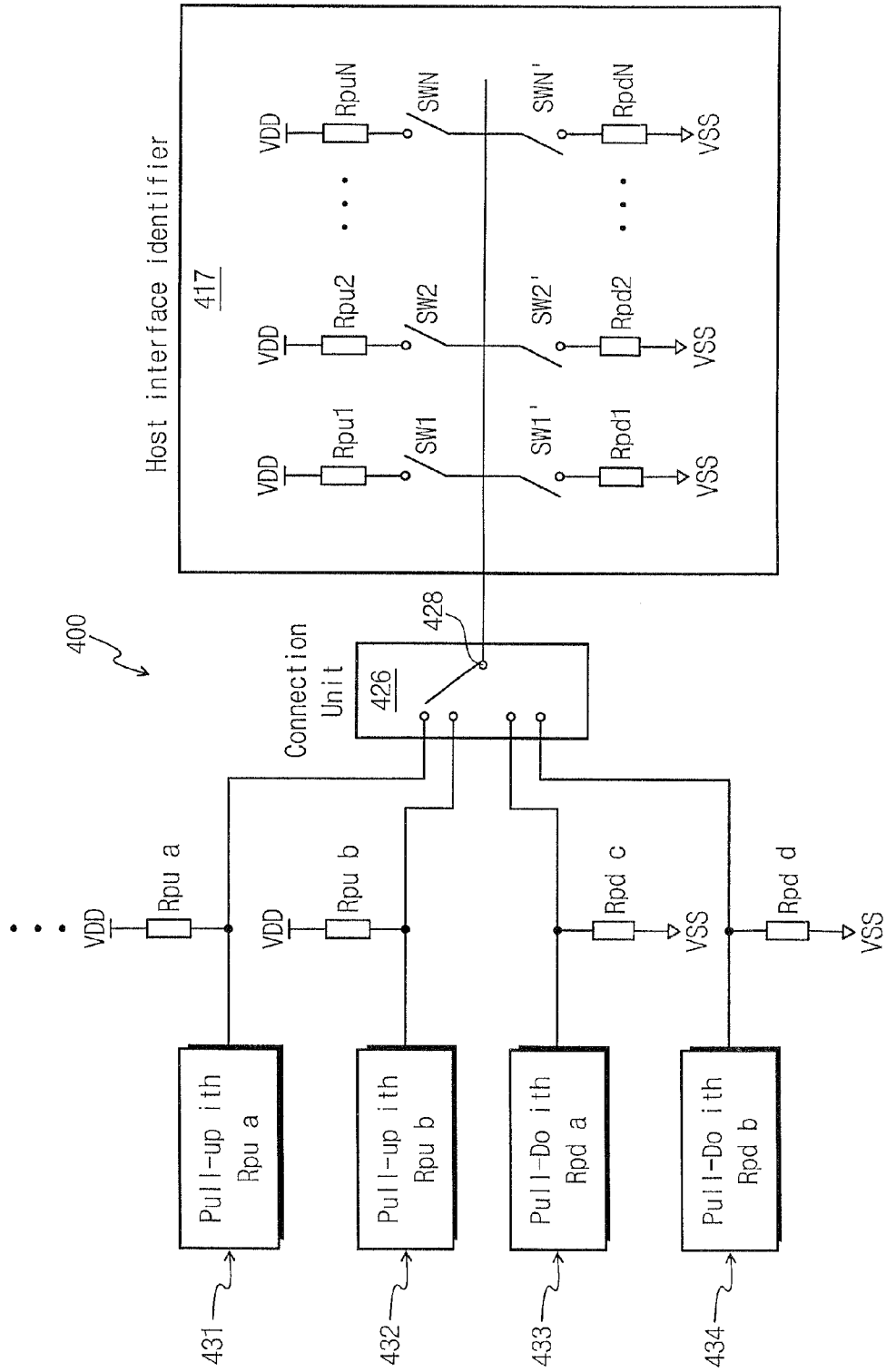
FIG. 4 shows a partial schematic circuit diagram of a host to device interface system for generic host interfaces in accordance with an exemplary embodiment of the present disclosure.

As shown in FIG. 4, an interface system in accordance with another exemplary embodiment of the present disclosure is indicated generally by the reference numeral 400. The system 400 includes a host interface identifier 417 in signal communication with a connection unit 426. The connection unit 426 is in switchable signal communication with one host at a time. A first host 431 has a high voltage potential VDD connected to an Rpu_a pull-up resistor, a second host 432 has a high voltage potential VoD connected to an Rpu_b pull-up resistor, a third host 433 has a low voltage potential VSS connected to an Rpd_c pull-down resistor, and a fourth host 434 has a low voltage potential VSS connected to an Rpd_d pull-down resistor. Other hosts may each have one of pull-up resistors Rpu_c through Rpu_z: or one of pull-down resistors Rpd_c through Rpd_z for example.

The host interface identifier 417 includes an output terminal 428 in signal communication with a switch SW1. The switch SW1 is in signal communication with a first pull-up resistor Rpu1, which, in turn, is in signal communication with the high voltage potential VOD The host interface identifier 417 further includes switches SW2 through SWN, each in signal communication with the output terminal 428. The switches SW2 through SWN are each in signal communication with a corresponding pull-up resistor of pull-up resistors Rpu2 through RpuN, which, in turn, are in signal communication with the high voltage potential VDD.

The host interface identifier 417 further includes a switch SW1'. The switch SW1' is in signal communication with a first pull-down resistor Rpd1 which, in turn, is in signal communication with the low voltage potential VSS. The host interface identifier 417 further includes switches SW2' through SWN', each in signal communication with the output terminal 428. The switches SW2' through SWN' are each in signal communication with a corresponding pull-down resistor of pull-down resistors Rpd2' through RpdN', which, in turn, are in signal communication with the low voltage potential VSS.

In one example, Rpu_a is greater than Rpu_b. Rpd1 is greater than Rpu_a. Rpu_a is greater than Rpd2, which is greater than Rpu_b. When the pull-down resistor Rpd1 is connected to the host interface, if the connection unit 426 is at a "High" voltage potential, the host interface might be either the pull-up 431 with Rpu_a or the pull-up 432 with Rpu_b, for example. When the pull-down resistor Rpd2 is connected to the host interface, if the connection unit 426 is still "High", the host interface is the pull-up 432 with Rpu_b. On the other hand, if the connection unit 426 is "Low" when the pull-down resistor Rpd2 is connected to the host interface, the host interface is the pull-up 431 with Rpu_a.

In another example Rpd_c is greater than Rpd_d. Rpu1 is greater than Rpd_c. Rpd_c is greater than Rpu2, which is greater than Rpd_d. When the pull-up resistor Rpu1 is connected to the host interface, if the connection unit 426 is "Low", the host interface might be the pull-down 433 with Rpd_c or the pull-down 434 with Rpd_d. When the pull-up resistor Rpu2 is connected to the host interface if the connection unit 426 is still "High", the host interface is the pull-down 433 with Rpd_c. On the other hand, if the connection unit 426 is "Low" when the pull-up resistor Rpu2 is connected to the host interface, the host interface is the pull-down 434 with Rpd_d.

Thus, by using suitable pull-up resistors or pull-down resistors, embodiments of the present disclosure identify host interfaces that have various pull-up resistors or pull-down resistors.

Figure 5:
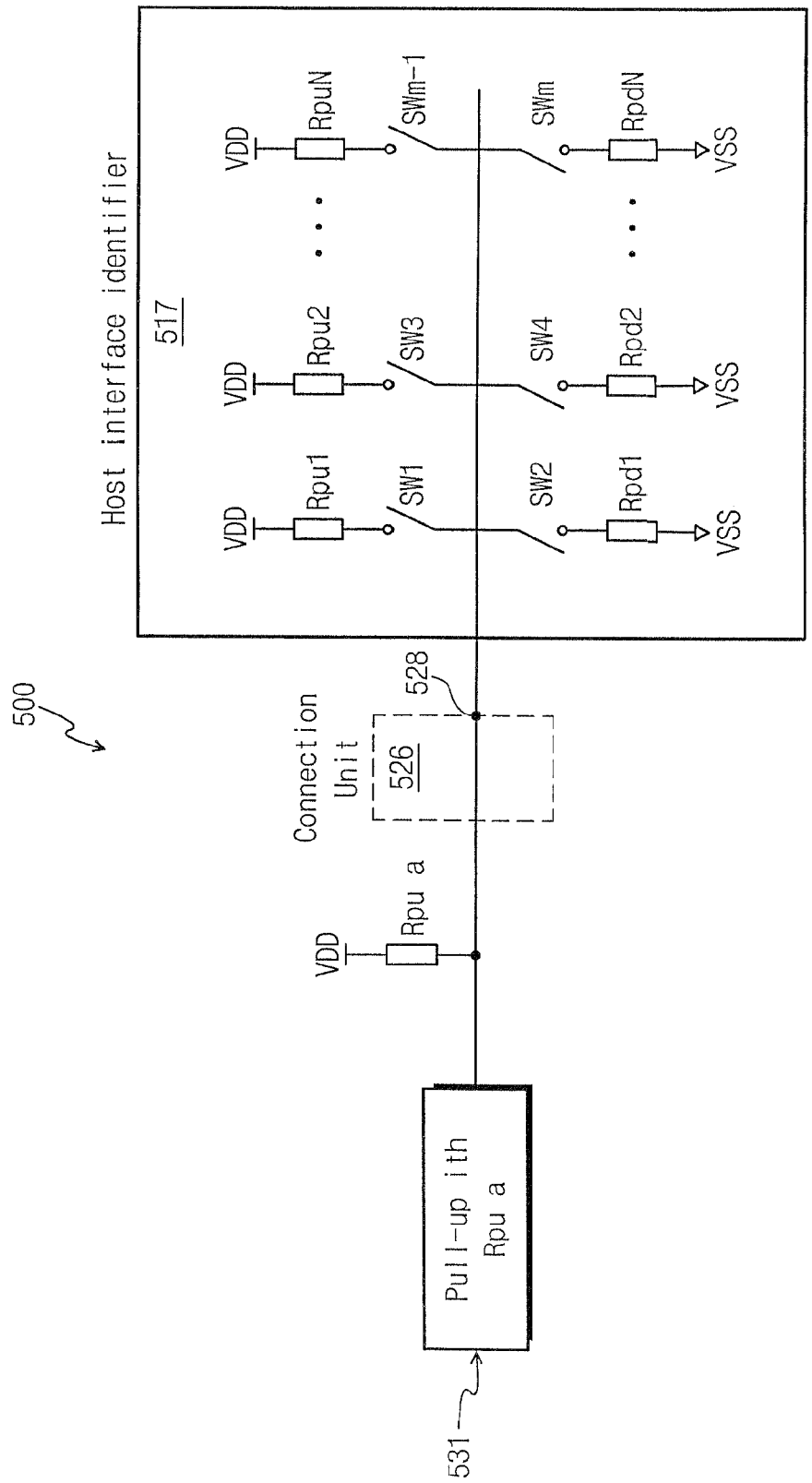
FIG. 5 shows a partial schematic circuit diagram of a host to device interface system for pull-up host interfaces in accordance with an exemplary embodiment of the present disclosure.

Turning to FIG. 5, an interface system in accordance with another exemplary embodiment of the present disclosure is indicated generally by the reference numeral 500. The system 500 includes a host interface identifier 517 in signal communication with a connection unit 526. The connection unit 526 is in signal communication with a host 531, which has a high voltage potential VOD connected to a pull-up resistor Rpu_a.

The host interface identifier 517 includes an output terminal 528 in signal communication with a switch SW1. The switch SW1 is in signal communication with a first pull-up resistor Rpu1, which, in turn, is in signal communication with the high voltage potential VDD. The host interface identifier 517 further includes odd numbered switches SW3 through SWm-1, each in signal communication with the output terminal 528. The odd numbered switches SW1 through SWm-1 are each in signal communication with a corresponding pull-up resistor of pull-up resistors Rpu1 through RpuN, which, in turn, are in signal communication with the high voltage potential VDD. Here, m=2 N.

The host interface identifier 517 further includes a switch SW2. The switch SW2 is in signal communication with a first pull-down resistor Rpd1, which, in turn, is in signal communication with the low voltage potential VSS. The host interface identifier 517 further includes even numbered switches SW4 through SWm, each in signal communication with the output terminal 528. The even numbered switches SW2 through SWm are each in signal communication with a corresponding pull-down resistor of pull-down resistors Rpd1 through RpdN, which, in turn, are in signal communication with the low voltage potential VSS.

Here, the connection unit 526 has a "Low" voltage potential when a pull-down resistor less than the pull-up resistor Rpu_a is connected to the host 531. The connection unit 526 has a "High" voltage potential when a pull-down resistor greater than Rpu_a is connected to the host 531. That is, the value of the Rpu_a exists between the two pull-down resistors where the connection unit 526 voltage potential changes from "High" to "Low".

Thus, this embodiment of the present disclosure can measure the value of a host pull-up resistor by sequentially connecting with smaller pull-down resistors to larger pull-down resistors in the host interface identifier 517. In addition, it can measure the value of a host pull-down resistor by sequentially connecting with smaller pull-up resistors to larger pull-up resistors in the host interface identifier 517.

Turning now to FIG. 6, an interface system in accordance with another exemplary embodiment of the present disclosure is indicated generally by the reference numeral 600. The system 600 includes a host interface identifier 617 in signal communication with a connection unit 626. The connection unit 626 is in signal communication with a host 633, which has a low voltage potential VSS connected to a pull-down resistor Rpd_c.

The host interface identifier 617 includes an output terminal 628 in signal communication with a switch SW1. The switch SW1 is in signal communication with a first pull-up resistor Rpu1, which, in turn, is in signal communication with the high voltage potential VDD. The host interface identifier 617 further includes odd numbered switches SW3 through SWm-1, each in signal communication with the output terminal 628. The odd numbered switches SW1 through SWm-1 are each in signal communication with a corresponding pull-up resistor of pull-up resistors Rpu1 through RpuN, which, in turn, are in signal communication with the high voltage potential VDD. Here. m=2 N.

The host interface identifier 617 further includes a switch SW2. The switch SW2 is in signal communication with a first pull-down resistor Rpd1, which, in turn, is in signal communication with the low voltage potential VSS. The host interface identifier 617 further includes even numbered switches SW4 through SWm, each in signal communication with the output terminal 628. The even numbered switches SW2 through SWm are each in signal communication with a corresponding pull-down resistor of pull-down resistors Rpd1 through RpdN, which, in turn, are in signal communication with the low voltage potential VSS.

Here, the connection unit 626 has a "High" voltage potential when a pull-up resistor less than Rpd_c is connected to the host 633. The connection unit 626 has a "Low" voltage potential when a pull-up resistor more than Rpd_c is connected to the host 633. The value of the pull-down resistor Rpd_c exists between the pair of pull-up resistors where the connection unit 626 changes from a "High" to a "Low" voltage potential.

Thus, this embodiment of the present disclosure can measure the value of a host pull-down resistor by sequentially connecting with smaller pull-up resistors to larger pull-up resistors in the host interface identifier 617. In addition, it can also measure the value of a host pull-up resistor by sequentially connecting with smaller pull-down resistors to larger pull-down resistors in the host interface identifier 617.

It is to be understood that the teachings of the present disclosure may be implemented in various forms of hardware, software, firmware, special purpose processors, or combinations thereof. Moreover, the software is preferably implemented as an application program tangibly embodied in a program storage device. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a display unit. The actual connections between the system components or the process function blocks may differ depending upon the manner in which the embodiment is programmed.

Although illustrative embodiments have been described herein with reference to the accompanying drawings, it is to be understood that the present disclosure is not limited to those precise embodiments, and that various other changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method of discerning a specification of a host interface with an interface identification apparatus, the method comprising:
   storing a plurality of predetermined data value sets associated with a plurality of potential host interface specification sets, respectively;
   sequentially connecting each of a plurality of pull resistors between a common pull voltage and the host interface, the plurality of pull resistors having a range of resistances that overlaps a range of interface resistances of potential host interfaces;
   measuring at least one loaded electrical characteristic of the host interface while each of the plurality of pull resistors is connected to the host interface;
   retrieving at least one stored predetermined data value set associated with at least one potential host interface specification set, respectively;
   comparing the at least one loaded electrical characteristic with at least one retrieved data value;
   identifying an associated specification of the host interface in accordance with at least one matching comparison to the at least one retrieved data value, respectively; and
   selecting a selectable device interface corresponding to the identified specification of the host interface.

2. The method as defined in claim 1 wherein:
   the loaded electrical characteristic comprises a loaded voltage; and
   the predetermined data value is a voltage value about halfway between the common pull voltage and ground.

3. The method as defined in claim 1 wherein the identified specification corresponds to a Multi-Media Card (MMC) specification, a Universal Serial Bus (USB) specification, or an ISO 7816 interface specification.

4. The method as defined in claim 1 wherein the pull resistors comprise pull-up resistors, the method further comprising selecting a value for one of the pull-up resistors relative to a value for a pull-down resistor of a potential interface specification.

5. The method as defined in claim 1 wherein the pull resistors comprise pull-down resistors, the method further comprising selecting a value for one of the pull-down resistors relative to the value for a pull-up resistor of a potential interface specification.

6. The method as defined in claim 1 wherein the common pull voltage comprises one of a supply voltage, or a ground voltage.

7. The method as defined in claim 1, further comprising selecting a device interface responsive to the identified specification for connection to a host.

8. A host interface identification apparatus comprising:
   an interface identifier having a plurality of switches coupled to an interface, each switch in signal communication with a corresponding pull resistor coupled to a common pull voltage; and
   a controller in signal communication with the interface identifier, the controller disposed for storing a plurality of predetermined data value sets associated with a plurality of potential host interface specification sets, respectively, sequentially connecting each of the plurality of pull resistors between the common pull voltage and the host interface, the plurality of pull resistors having a range of resistances corresponding to a range of interface resistances of potential host interfaces, measuring at least one loaded electrical characteristic of the host interface while each of the plurality of pull resistors is connected to the host interface, retrieving at least one stored predetermined data value set associated with at least one potential host interface specification set, respectively, comparing the at least one loaded electrical characteristic with the at least one retrieved data value, identifying an associated specification of the host interface in accordance with at least one matching comparison to the at least one retrieved data value, respectively, and selecting a selectable device interface corresponding to the identified specification of the host interface.

9. The apparatus as defined in claim 8, further comprising:
   a controller in signal communication with the host interface identifier; and
   at least one selectable device interface in signal communication with the controller.

10. The apparatus as defined in claim 8, further comprising:
    measurement means for measuring the at least one loaded electrical characteristic of the host interface;
    comparator means for comparing the at least one loaded electrical characteristic with a predetermined data value; and
    identifier means for identifying a specification of the host interface in accordance with the comparison.

11. The apparatus as defined in claim 8, wherein the common pull voltage is a supply voltage, or ground.

12. The apparatus as defined in claim 8, further comprising at least one sensor for measuring a loaded electrical characteristic of the host interface.

13. The apparatus as defined in claim 12 wherein the at least one sensor comprises a current sensor for measuring a loaded current through the host interface, or a voltage sensor for measuring a loaded voltage across the host interface.

14. The apparatus as defined in claim 9 wherein:
    the pull resistors are a pair of pull-up resistors, one having a resistance value greater than the value for a pull-down resistor of a potential interface specification and the other having a resistance value less than the value for a pull-down resistor of a potential interface specification; or
    the pull resistors are a pair of pull-down resistors, one having a resistance value greater than the value for a pull-up resistor of a potential interface specification and the other having a resistance value less than the value for a pull-up resistor of a potential interface specification.

15. A multimedia system comprising:
    a host having at least one interface;
    a device in signal communication with the at least one interface, the device comprising:
      an interface identifier for identifying a specification of the at least one interface, the interface identifier having at least one electrical characteristic sensor in signal communication with the at least one interface, at least two switches coupled to the at least one interface, each switch in signal communication with a corresponding pull resistor coupled to a pull voltage; at least one selectable device interface in signal communication with the host for communicating with the host in response to the electrical characteristic sensor; and a controller in signal communication with the interface identifier, the controller disposed for storing a plurality of predetermined data value sets associated with a plurality of potential host interface specification sets, respectively, sequentially connecting each of a plurality of pull resistors between a common pull voltage and the host interface, the plurality of pull resistors having a range of resistances that overlaps a range of interface resistances of potential host interfaces, measuring at least one loaded electrical characteristic of the host interface while each of the plurality of pull resistors is connected to the host interface, retrieving at least one stored predetermined data value set associated with at least one potential host interface specification set, respectively, comparing the at least one loaded electrical characteristic with the at least one retrieved data value, identifying an associated specification of the host interface in accordance with at least one matching comparison to the at least one retrieved data value, respectively, and selecting a selectable device interface corresponding to the identified specification of the host interface.

16. The system as defined in claim 15, further comprising:
a controller in signal communication with the host interface identifier,
wherein the selectable device interface is in signal communication with the controller.

17. The system as defined in claim 15 wherein the common pull voltage is a supply voltage or ground.

18. The system as defined in claim 15, the at least one electrical characteristic sensor comprising a current sensor for measuring a loaded current through the interface and/or a voltage sensor for measuring a loaded voltage across the host interface.

19. A method of discerning a specification of a host interface with an interface identification apparatus, the method comprising:
storing a plurality of predetermined data value sets associated with a plurality of potential host interface specification sets, respectively;
connecting at least one pull resistor to the host interface;
sequentially applying at least one pull voltage to the at least one pull resistor;
measuring at least one loaded electrical characteristic of the host interface while the sequentially applied at least one pull voltage is applied to the at least one pull resistor;
retrieving at least one stored predetermined data value set associated with at least one potential host interface specification set, respectively;
comparing the at least one loaded electrical characteristic with at least one retrieved data value;
identifying an associated specification of the host interface in accordance with at least one matching comparison to the at least one retrieved data value, respectively; and
selecting a selectable device interface corresponding to the identified specification of the host interface,
wherein the plurality of predetermined data value sets associated with a plurality of potential host interface specification sets includes:
a first data value set including a logic high data value for a first pull-up resistor, a logic high data value for a second pull-up resistor, a logic high data value for a first pull-down resistor, and a logic low data value for a second pull-down resistor, the first data value set corresponding to an MMC pull-up host interface specification;
a second data value set including a logic low data value for a first pull-up resistor, a logic high data value for a second pull-up resistor, a logic low data value for a first pull-down resistor, and a logic low data value for a second pull-down resistor, the first data value set corresponding to a USB pull-down host interface specification;
a third data value set including a logic high data value for a first pull-up resistor, a logic high data value for a second pull-up resistor, a logic low data value for a first pull-down resistor, and a logic low data value for a second pull-down resistor, the first data value set corresponding to an ISO-7816 High-Z host interface specification;
a fourth data value set including a logic high data value for a first pull-up resistor, a logic high data value for a second pull-up resistor, a logic high data value for a first pull-down resistor, and a logic high data value for a second pull-down resistor, the first data value set corresponding to an ISO-7816 VDD host interface specification; and
a fifth data value set including a logic low data value for a first pull-up resistor, a logic low data value for a second pull-up resistor, a logic low data value for a first pull-down resistor, and a logic low data value for a second pull-down resistor, the first data value set corresponding to an ISO-7816 VSS host interface specification.

* * * * *